(12) United States Patent
Komori

(10) Patent No.: US 6,765,809 B2
(45) Date of Patent: Jul. 20, 2004

(54) POWER SOURCE CIRCUIT HAVING REGULATED PRIMARY CURRENT

(75) Inventor: Chihiro Komori, Yokohama (JP)

(73) Assignee: Samsung Electronics Co., Ltd., Süwon-si (KR)

( * ) Notice: Subject to any disclaimer, the term of this patent is extended or adjusted under 35 U.S.C. 154(b) by 0 days.

(21) Appl. No.: 10/266,921

(22) Filed: Oct. 9, 2002

(65) Prior Publication Data

US 2003/0090911 A1 May 15, 2003

(30) Foreign Application Priority Data

Oct. 9, 2001 (JP) .......................................... 2001-311795

(51) Int. Cl.[7] ............................................. H02M 3/335
(52) U.S. Cl. ....................................... 363/19; 363/56.01
(58) Field of Search .............................. 363/16, 18, 19, 363/56.01, 95, 97

(56) References Cited

U.S. PATENT DOCUMENTS 4,443,838 A * 4/1984 Yamada ........................ 363/19
4,862,338 A * 8/1989 Tanaka .......................... 363/19
5,917,712 A * 6/1999 Okura et al. ................... 363/19
6,072,702 A * 6/2000 Nakao et al. .................. 363/19
6,577,511 B2 * 6/2003 Yamaguchi et al. ...... 363/21.07

* cited by examiner

Primary Examiner—Adolf Berhane
(74) Attorney, Agent, or Firm—Staas & Halsey LLP

(57) ABSTRACT

A power source including a transformer having a primary coil, a secondary coil, and a feedback coil; a resonance capacitor connected in parallel with the primary coil of the transformer in parallel, a switching unit having an input terminal which receives an input voltage input from the feedback coil of the transformer and which controls a current through the primary coil of the transformer according to the input voltage; and a current detection unit which detects the current in order to turn off the switching unit when the detected current is higher than a predetermined current. An output voltage stabilization circuit controls the input voltage at the input terminal of the switching unit, proportional to a voltage output by the secondary coil of the transformer.

9 Claims, 5 Drawing Sheets

POWER SOURCE CIRCUIT HAVING REGULATED PRIMARY CURRENT

CROSS REFERENCE TO RELATED APPLICATIONS

This application claims the benefit of Japanese Patent Application No. 2001-311795, filed Oct. 9, 2001 in the Japanese Intellectual Property Office, the disclosure of which is incorporated herein by reference.

1. Field of the Invention

The present invention relates to a power source circuit, and more particularly, to a power source circuit used in an electrophotographic printer.

2. Description of the Related Art

FIG. 1 is a circuit diagram illustrating a conventional power source circuit. In general, the conventional power source circuit has a self-oscillation circuit at a primary side of a transformer 10. According to the operation of a fly wheel diode 30, which is connected to a switching transistor 20 in the self-oscillation circuit in parallel or embedded in the switching transistor 20, a primary fly back pulse, which is input to the primary side of the transformer 10, becomes a waveform similar to half of a sine wave. Since the transformer 10 boosts the waveform similar to the half of a sine wave, a secondary side of the transformer 10 also outputs a waveform similar to the waveform occurring on the primary side of the transformer 10. The waveform output from the secondary side of the transformer 10 is input to a voltage doubler circuit.

In the conventional power source circuit, the switching transistor may operate in a linear region, i.e., an active region, so that a problem of power loss, for example, the generation of heat, occurs in the switching transistor.

In addition, since the waveform similar to the half of a sine wave is output from the secondary side of the transformer and the output waveform is input to the voltage doubler circuit connected to the secondary side of the transformer, the voltage utility efficiency of the voltage doubler circuit deteriorates. More specifically, the waveform similar to the half of a sine wave obtains only half an amount of the transformer output voltage.

Further, where the coil ratio of the transformer increases in order to output a high voltage from the secondary side of the transformer, the voltage loss due to the distribution capacity of coils is increased and the boosting efficiency where the transformer boosts a voltage is lowered.

SUMMARY OF THE INVENTION

To solve the above-described and other problems, an object of the present invention is to provide a power source circuit for reducing power loss in a switching transistor, improving the voltage utility efficiency of a circuit connected to the secondary side of a transformer, and preventing a deterioration of boosting efficiency where the transformer boosts a voltage.

Additional objects and advantages of the invention will be set forth in part in the description which follows, and, in part, will be obvious from the description, or may be learned by practice of the invention.

To achieve the above and other objects of the invention, according to one aspect of the present invention, there is provided a power source circuit comprising a transformer having a primary coil, a secondary coil, and a feedback coil, a resonance capacitor connected in parallel with the primary coil of the transformer, a switching unit having an input terminal connected to one end of the feedback coil of the transformer and an output terminal connected to one end of the primary coil of the transformer and controlling a current, which flows through the output terminal, according to a voltage input to the input terminal, and a current detection unit which detects the current, which flows through the switching unit, in order to turn off the switching unit when the detected current is higher than a predetermined current. Here, the end of the feedback coil connected to the input terminal of the switching unit and the end of the primary coil connected to the output terminal of the switching unit have different polarities.

Since the switching unit, for example, a switching transistor, operates in a switching region, i.e., a saturation region, a collector loss in the switching transistor is reduced. In other words, a collector voltage increases while a sufficient amount of base current flows so that the switching transistor operates in a switching region.

The current detection unit may comprise a resistor connected in series with the switching unit and a voltage clamp unit connected to a control terminal of the switching unit.

The power source circuit may further comprise a current direction restriction unit for restricting the direction of the current which flows between the end of the primary coil of the transformer and the output terminal of the switching unit.

A waveform input to the primary side of the transformer may be similar to a sine wave so that the waveform of a voltage output from the secondary side of the transformer is similar to the sine wave. Therefore, since the waveform similar to the sine wave is input to a circuit, which is connected to the secondary side of the transformer, the voltage utility efficiency of the circuit connected to the secondary side of the transformer improves.

The power source circuit may further comprise an output voltage stabilization circuit for controlling a voltage, which is input to the input terminal of the switching unit, according to the output voltage from the secondary coil of the transformer.

Accordingly, the voltage output from the power source circuit is stabilized.

BRIEF DESCRIPTION OF THE DRAWINGS

The above and other objects and advantages of the present invention will become more apparent by describing in detail embodiments thereof with reference to the attached drawings in which.

DESCRIPTION OF THE PREFERRED EMBODIMENTS

Figure 1:
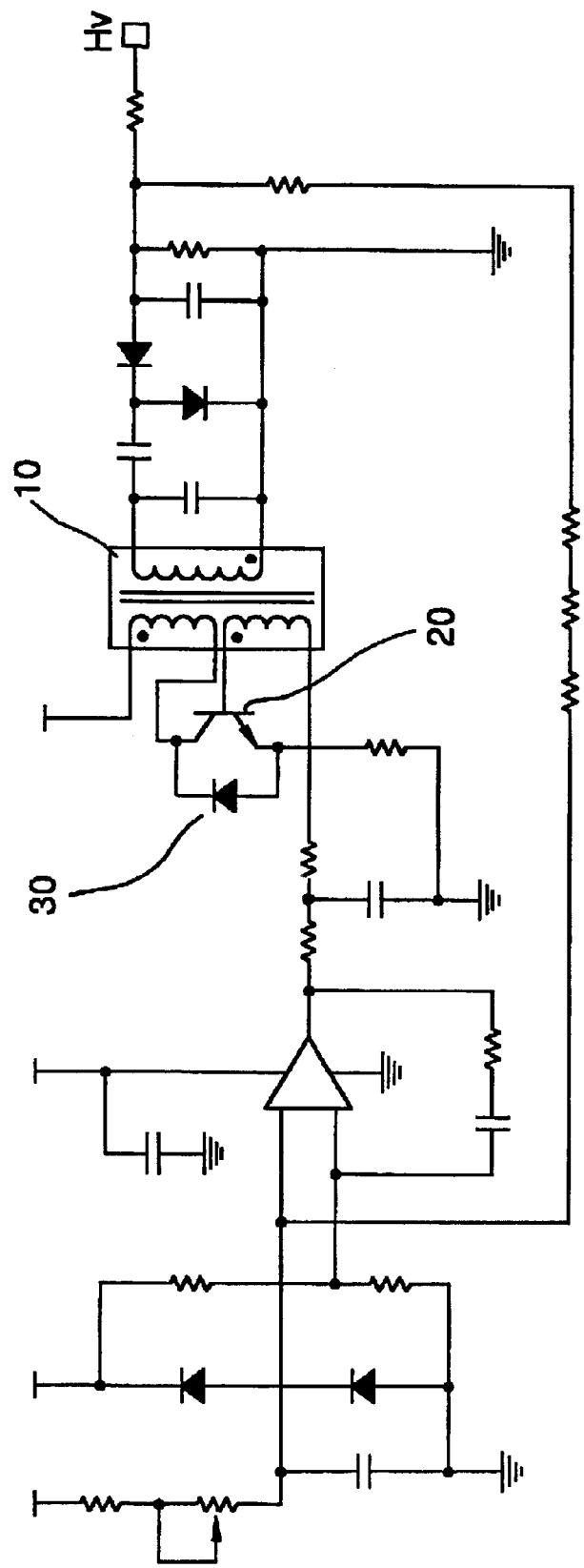
FIG. 1 is a circuit diagram illustrating a conventional power source circuit.

Reference will now be made in detail to the present embodiments of the present invention, examples of which are illustrated in the accompanying drawings, wherein like reference numerals refer to like elements throughout.

Figure 2:
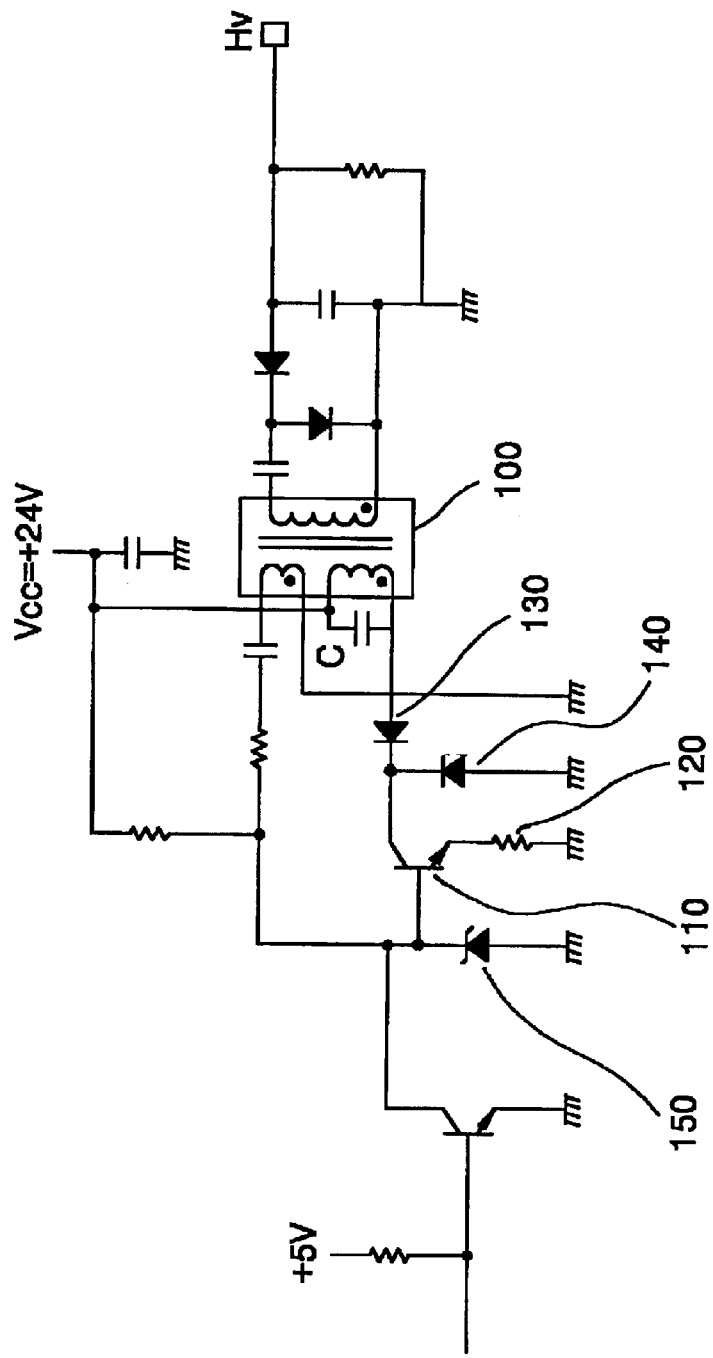
FIG. 2 is a circuit diagram illustrating a power source circuit according to a first embodiment of the present invention.

FIG. 2 is a circuit diagram illustrating a power source circuit according to a first embodiment of the present invention. An oscillation circuit is formed at a primary side of a transformer 100. Here, the oscillation circuit includes a switching transistor 110, a current detection resistor 120, current restriction diodes 130 and 140, and a zener diode 150. A voltage doubler circuit for boosting the voltage output from the secondary side of the transformer 100 is connected to the secondary side of the transformer 100.

Figure 3:
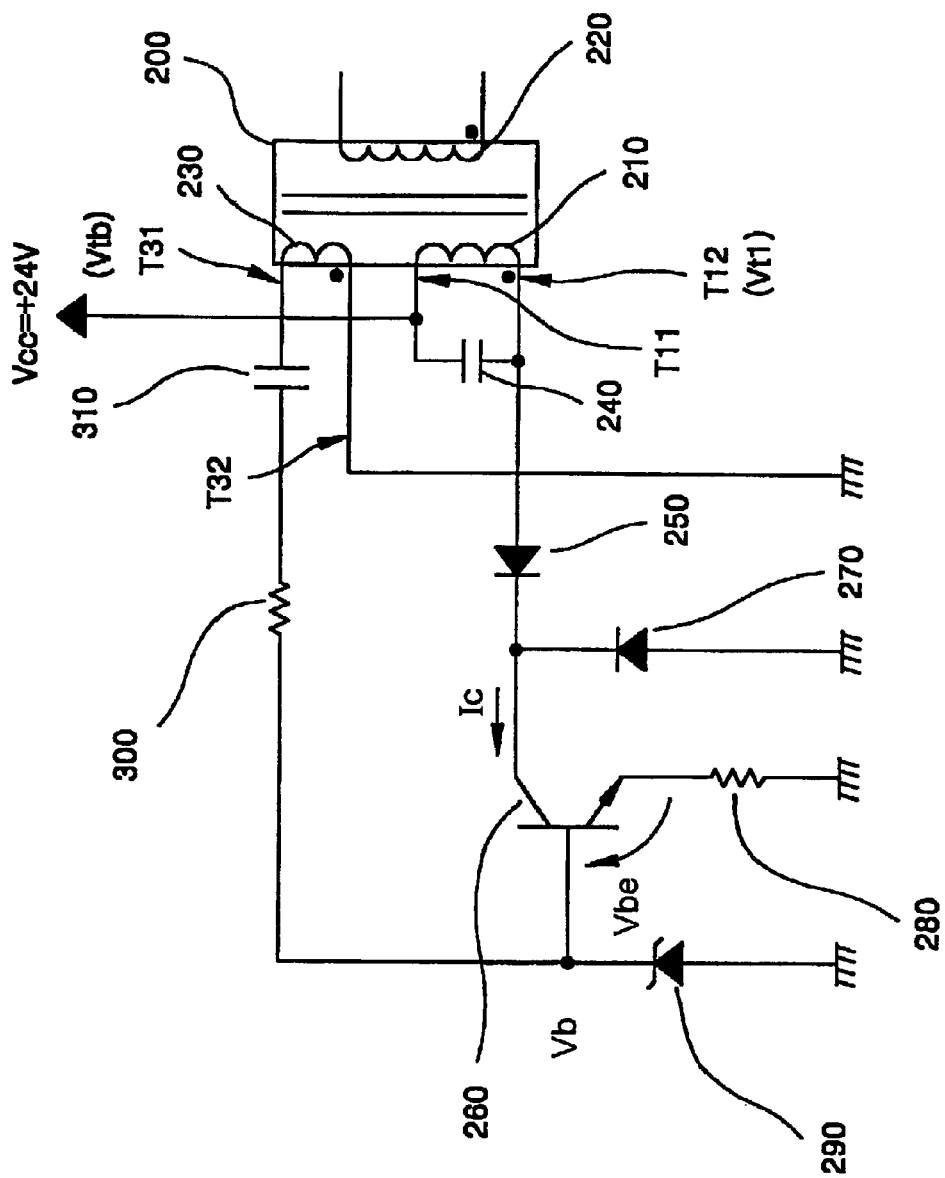
FIG. 3 is a detailed circuit diagram illustrating an oscillation circuit of the power source circuit according to the first embodiment of the present invention shown in FIG. 2.

FIG. 3 is a detailed circuit diagram illustrating the oscillation circuit of the power source circuit shown in FIG. 2. The transformer 200 has a primary coil 210, a secondary coil 220, and a feedback coil 230. Here, a resonance capacitor 240 is connected in parallel with the primary coil 210. A terminal T11 of the primary coil 210 is connected to a power source voltage Vcc of +24 V and a terminal T12 of the primary coil 210 is connected to an anode of the current restriction diode 250. A cathode of the current restriction diode 250 is connected to a collector of the switching transistor 260 and a cathode of the current restriction diode 270. In addition, an anode of the current restriction diode 270 is grounded. A current detection resistor 280 is connected between an emitter of the switching transistor 260 and ground. A cathode of the zener diode 290 is connected to a base of the switching transistor 260 and an anode of the zener diode 290 is grounded. The base of the switching transistor 260 is connected to a terminal T31 of the feedback coil 230 of the transformer 200 through a resistor 300 and a capacitor 310. A terminal T32 of the feedback coil 230 of the transformer T200 is grounded.

Figures 4A, 4B, 4C:
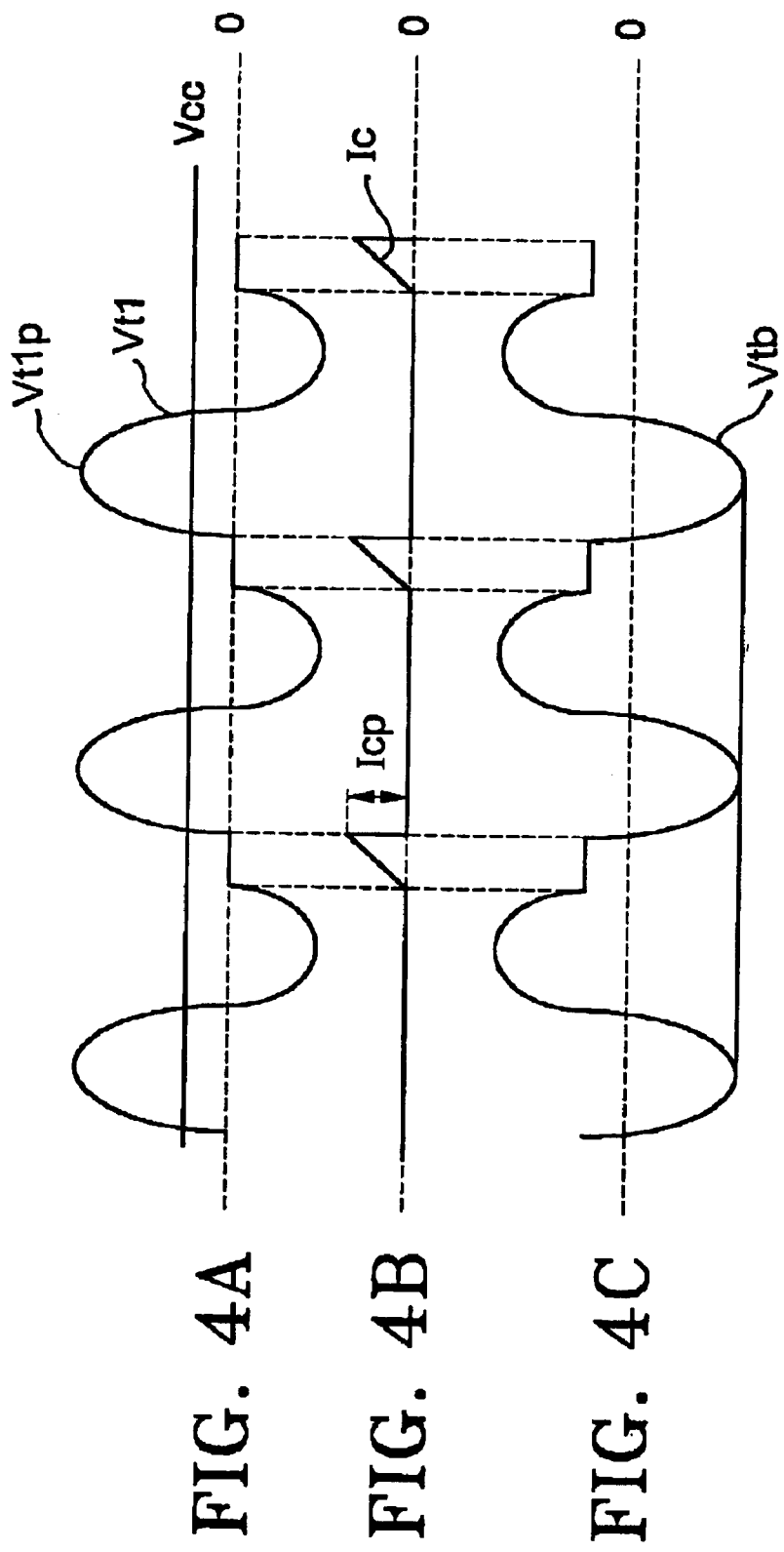
FIGS. 4A through 4C illustrate waveforms for explaining the operation of the oscillation circuit of FIG. 3.

FIGS. 4A through 4C illustrate waveforms for explaining an operation of the oscillation circuit of FIG. 3.

FIG. 4A illustrates a waveform of a voltage Vt1 at the terminal T12 of the primary coil 210 in the transformer 200. FIG. 4B illustrates a waveform of a collector current Ic, which flows into the collector of the switching transistor 260. FIG. 4C illustrates a waveform of a voltage Vtb at the terminal T31 of the feedback coil 230 in the transformer 200.

When the switching transistor 260 is turned off, the voltage Vt1 having a sine wave of FIG. 4A occurs at the terminal T12 by the resonance between the primary coil 210 of the transformer 200 and the resonance capacitor 240 connected in parallel with the primary coil 210. When the current according to the voltage Vt1 having the sine wave flows through the primary coil 210, the voltage Vtb of FIG. 4C occurs at the terminal T31 of the feedback coil 230 by a mutual induction of the primary coil 210 and the feedback coil 230. Here, the terminal T12 of the primary coil 210 and the terminal T31 of the feedback coil M3 230 have different polarities according to the polarities of the primary coil 210 and the feedback coil 230 so that the voltages Vt1 and Vtb are out of phase as shown in FIGS. 4A and 4C.

When the voltage Vtb has a positive value, a base current starts to flow through the switching transistor 260 so that the switching transistor 260 is turned on. Here, since the voltage Vt1 has a negative value, the collector current Ic does not flow. Thereafter, when the voltage Vt1 changes from negative to positive, the potential of the collector of the switching transistor 260 becomes positive. Accordingly, the switching transistor 260 is turned on and the collector current Ic starts to flow. In other words, when the base current starts to flow through the switching transistor 260, a value of the collector current Ic is zero, which is referred to as a zero-cross switching.

As described above, the switching transistor 260 according to the first embodiment of the present invention operates in a switching region instead of in a linear region having a large collector loss. In addition, the switching occurs at a zero-cross timing, which reduces a switching loss. Therefore, the power loss in the switching transistor 260 is significantly reduced. As a result, a switching transistor having a lower power rating may be used without a heat sink and an inexpensive power source circuit is obtainable.

The collector current Ic, which starts to flow the switching transistor 260 is turned on, gradually increases by the operation of the primary coil 210 in the transformer 200, as illustrated in Equation 1.

$$Ic = Vcc \times t / L \quad (1)$$

Here, Vcc denotes a power source voltage, t denotes an amount of time from a moment when the collector current Ic starts to flow, and L denotes an inductance of the primary coil 210 of the transformer 200.

In addition, a peak value Icp of the collector current Ic is calculated by Equation 2.

$$Icp = (Vb - Vbe) / Re \quad (2)$$

where Re is a value of the current detection resistor 280.

Here, Vb denotes a base potential of the switching transistor 260 and Vbe denotes a voltage between the base and the emitter of the switching transistor 260.

In addition, when the maximum value of the voltage Vt1 is referred to as Vt1p, Vt1p is calculated by Equation 3.

$$Vt1p = Icp \times (L/C)^{1/2} \quad (3)$$

where L is the inductance of the primary coil 210 and C is a capacitance of the capacitor 240.

A current, which is almost the same as the collector current Ic, is output from the emitter of the switching transistor 260, and the emitter current also flows through the current detection resistor 280 connected to the emitter of the switching transistor 260. Accordingly, a voltage drop of Ic×Re occurs across the current detection resistor 280.

The base potential Vb of the switching transistor 260 is stabilized by the zener diode 290. In other words, the zener diode 290 is connected to the switching transistor 260 in order to operate as a voltage clamp unit. Here, when the collector current Ic increases, the voltage drop Ic×Re across the current detection resistor 280 also increases, where Re is the value of the current detection resistor 280. Where the base current of the switching transistor 260 decreases, the increase of the collector current Ic stops. Since the output voltage of the feedback coil 230 is proportional to dIc/dt, the output voltage of the feedback coil 230 suddenly becomes zero and the switching transistor 260 is suddenly turned off. In the switching operation, the voltage between the collector and the emitter of the switching transistor 260 is almost zero while the collector current Ic flows. Accordingly, the switching operation is referred to as the zero cross switching. The oscillation circuit oscillates by repeating the above-described operation.

Where the voltage Vt1 of the terminal T12 of the primary coil 210 in the transformer 200 has a negative value, i.e., lower than the ground potential, the current restriction diode 250 blocks the connection between the terminal T12 of the primary coil 210 and the collector of the switching transistor 260. Therefore, the voltage input to the primary side of the transformer T200 has a waveform similar to a sine wave instead of the half of a sine wave so that the voltage output from the secondary side of the transformer 200 has a waveform similar to the sine wave. In addition, since the waveform similar to the sine wave is input to a voltage doubler circuit, which is connected to the secondary side of the transformer 200, the voltage doubler circuit operates efficiently. In other words, although a conventional power source circuit obtains a voltage level, which is the same as the amplitude of a waveform input to the voltage doubler circuit, the power source circuit according to the first embodiment obtains a voltage twice as large as the input to the voltage doubler circuit.

Therefore, the power source circuit according to the first embodiment obtains the same voltage as the conventional power source circuit by using a voltage doubler circuit having a smaller number of elements than the voltage doubler circuit in the conventional power source circuit. Thus, a size and a cost of the power source circuit are reduced.

In addition, the power source circuit according to the first embodiment increases the amplitude of the waveform, which is input to the primary coil 210 of the transformer 200, to be higher than the power source voltage Vcc by the resonance between the inductance of the primary coil 210 and the resonance capacitor 240 connected to the primary coil 210 in parallel. Thus, the turns ratio of the primary coil 210 to the secondary coil 220 in the transformer T200 may be reduced. As a result, the power source circuit according to the first embodiment reduces a loss due to the distribution capacity of the coils and improves the efficiency when the transformer 200 boosts the voltage. In addition, the size and the cost of the transformer 200 may be reduced.

Figure 5:
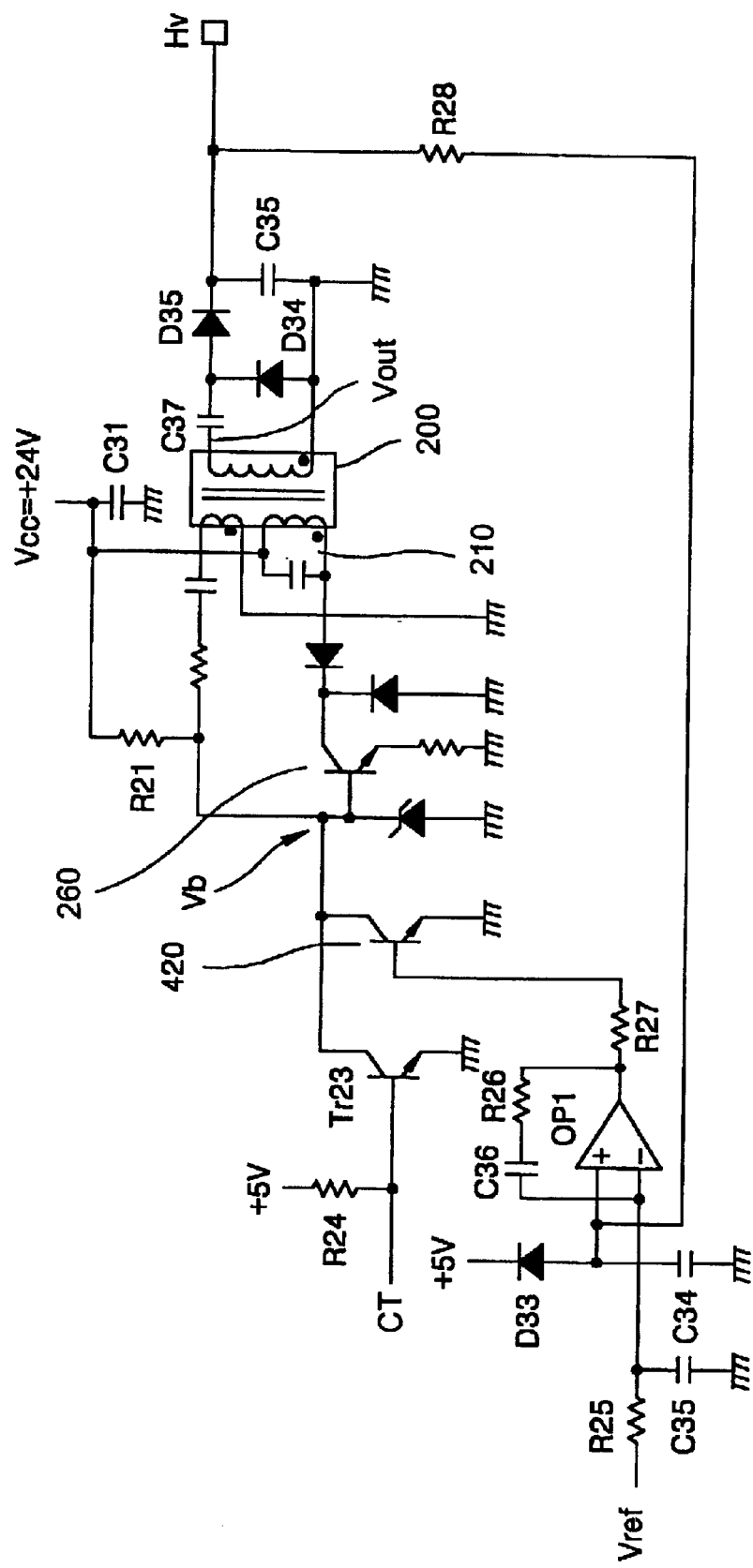
FIG. 5 is a circuit diagram illustrating a power source circuit according to a second embodiment of the present invention.

FIG. 5 is a circuit diagram illustrating a power source circuit according to a second embodiment of the present invention.

The power source circuit according to the second embodiment feeds back an output voltage Hv and compares the fed back output voltage Hv with a reference voltage Vref in order to adjust a voltage to be applied to a base of a switching transistor 410 and to stabilize the output voltage Hv according to the comparison result.

In the second embodiment as shown in FIG. 5, the transformer 200 develops an output voltage across the coil 220 in a similar manner as explained in the first embodiment shown in FIG. 3. Capacitors C37 and C35 along with diodes D34 and D35 form a well known voltage doubler rectifier circuit which delivers an output voltage Hv. Feedback resistor R28 provides a sample of the output voltage Hv to a first input of an operational amplifier OP1 which compares the sampled output Hv with a reference voltage Vref which is decoupled by a resistor R25 and capacitor C35 and input to a second input of the operational amplifier OP1. A capacitor C34 connected between the first input of the operational amplifier OP1 and ground provides filtering for the sampled output voltage Hv and a diode D33 connected between the first input of the operational amplifier OP1 and a predetermined reference voltage, indicated as +5V in the example shown, limits the input of the operational amplifier OP1 to a value near the predetermined reference voltage. A capacitor C36 and a resistor R26 are series connected between an output and the second input of the operational amplifier OP1. The output of the operational amplifier OP1 drives a base of a transistor 420 via a coupling resistor R27. A collector of the transistor 420 is connected to the base of the transistor 260 and to an end of a resistor R21 which has another end connected to the power source Vcc. The emitter of transistor 420 is grounded. The collector of transistor 420 is also connected to a collector of a transistor Tr23. A base of the transistor Tr23 is supplied from a voltage source through a resistor R24. The base of the transistor Tr23 is also connected to a control terminal CT which provides for further control of the transistor 260. The emitter of the transistor TR23 is returned to ground.

Where the base potential Vb of the switching transistor 260 is controlled using a transistor 420, the amplitude of a voltage applied to a primary coil 210 of the transformer 200, i.e., the maximum voltage Vt1p (FIG. 4A) is controllable. Accordingly, the output voltage Vout from the secondary side of the transformer 200 is controllable.

As described above, in the power source circuit according to the present invention, the switching transistor 260 operates in the switching region instead of the linear region having a large collector loss.

In addition, in the power source circuit according to the present invention, the switching occurs at the zero cross timing where the switching loss is small. Thus, the power loss in the switching transistor is significantly reduced. Accordingly, a small sized switching transistor having a lower power rating and which does not require a heat sink, is useable so that the cost of manufacturing the power source circuit is reduced.

Furthermore, in the power source circuit according to the present invention, the waveform of the voltage input to the primary side of the transformer is similar to a sine wave so that the waveform of the voltage output from the secondary side of the transformer is also similar to the sine wave. Thus, since the waveform similar to the sine wave is input to the voltage doubler circuit, which is connected to the secondary side of the transformer, the voltage doubler circuit operates efficiently. The conventional power source circuit obtains a voltage level which is the same as the amplitude of the waveform input to the voltage doubler circuit. The power source circuit according to the present invention obtains a voltage which is twice as large as the amplitude of the waveform input to the voltage doubler circuit.

The power source circuit according to the present invention obtains the same voltage by using the voltage doubler circuit having smaller number of elements than the voltage doubler circuit of the conventional power source circuit so that the size and the cost of the power source circuit according to the present invention are reduced.

In addition, the power source circuit according to the present invention increases the amplitude of the waveform, which is input to the primary coil of the transformer, to be higher than the power supply voltage, by the resonance between the inductance of the primary coil of the transformer and the capacitor connected in parallel with the primary coil. Thus, the turns ratio of the primary coil to the secondary coil in the transformer may be reduced. As a result, the power source circuit according to the present invention reduces a loss due to the distribution capacity of the coils and improves the efficiency of the transformer in boosting the output voltage. In addition, the size and the cost of the transformer may be reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:
1. A power source circuit comprising:
   a transformer having a primary coil, a secondary coil, and a feedback coil;
   a resonance capacitor connected with the primary coil of the transformer in parallel;

a switching unit having an input terminal which receives an input voltage based on a voltage at one end of the feedback coil of the transformer and which controls a current flowing through the switching unit from one end of the primary coil of the transformer according to the input voltage; and a current detection unit which detects the current, and which turns off the switching unit when the detected current is higher than a predetermined current, wherein the one end of the feedback coil and the one end of the primary coil have different polarities.

2. The power source circuit of claim 1, wherein the current detection unit comprises a resistor connected in series with the switching unit and a voltage clamp unit connected to the input terminal of the switching unit.

3. The power source circuit of claim 1, further comprising a current direction restriction unit which restricts a direction of the current.

4. The power source circuit of claim 1, further comprising an output voltage stabilization circuit which controls the input voltage at the input terminal of the switching unit based on an output voltage at the secondary coil of the transformer.

5. The power source circuit of claim 2, further comprising an output voltage stabilization circuit which controls the input voltage at the input terminal of the switching unit based on an output voltage at the secondary coil of the transformer.

6. The power source circuit of claim 3, further comprising an output voltage stabilization circuit which controls the input voltage at the input terminal of the switching unit based on an output voltage at the secondary coil of the transformer.

7. A power source circuit comprising:

a transformer having a primary coil, a secondary coil, and a feedback coil, the primary coil having one terminal supplied from a first direct current voltage source having a predetermined value; and a driver circuit which induces an oscillatory voltage across the primary coil by controlling a current in the primary coil in response to a voltage induced in the feedback coil, wherein a polarity of the feedback coil is opposite to a polarity of the primary coil;

a rectifier circuit which converts a sine wave voltage induced on the secondary coil to a second direct current voltage; and a feedback circuit which compares the second direct current voltage with a predetermined reference value and adjusts the current in the primary coil according to a difference between the second direct current voltage and the predetermined reference value.

8. A power source circuit, comprising:

a transformer having a primary coil, a secondary coil, and a feedback coil, the primary coil having one terminal supplied from a first direct current voltage source having a predetermined value; and a driver circuit which induces an oscillatory voltage across the primary coil by controlling a current in the primary coil in response to a voltage induced in the feedback coil, wherein a polarity of the feedback coil is opposite to a polarity of the primary coil;

a rectifier circuit which converts a sine wave voltage induced on the secondary coil to a second direct current voltage; and a feedback circuit which compares the second direct current voltage with a predetermined reference value and adjusts the current in the primary coil according to a difference between the second direct current voltage and the predetermined reference value, wherein the feedback circuit comprises:

a scaling network which scales a value of the second direct current voltage, an operational amplifier which compares the scaled direct current voltage with the predetermined reference value, and a control transistor which adjusts the input voltage based on the comparison.

9. The power source circuit of claim 8, wherein the rectifier circuit is a voltage doubler rectifier circuit.

* * * * *